United States Patent [19]

Walmsley et al.

[11] 3,973,883
[45] Aug. 10, 1976

[54] ROTARY PISTON MACHINES

[75] Inventors: Robert Edwin Walmsley, Marlow; Robert Oliver, Wargrave; Norman Ernest Fisher, St. Albans, all of England

[73] Assignee: Vandervell Products Limited, England

[22] Filed: July 20, 1973

[21] Appl. No.: 381,353

[30] Foreign Application Priority Data

July 25, 1972 United Kingdom............... 34788/72

[52] U.S. Cl......................... 418/178; 29/156.4 WL; 418/179
[51] Int. Cl.².......................................... F01C 21/10
[58] Field of Search ............. 418/178, 179; 92/169, 92/170, 171; 29/156.4 WL, 463

[56] References Cited
UNITED STATES PATENTS

| | | | |
|---|---|---|---|
| 2,345,975 | 4/1944 | Herman | 418/178 |
| 2,519,588 | 8/1950 | McCulloch | 418/178 |
| 2,966,860 | 1/1961 | Maynard | 418/178 |
| 3,239,135 | 3/1966 | Fritz | 418/179 |
| 3,289,649 | 12/1966 | Lamm | 418/179 |
| 3,359,615 | 12/1967 | Bauer | 418/178 |
| 3,359,953 | 12/1967 | Groth | 418/178 |
| 3,680,990 | 8/1972 | Pettibone et al. | 418/178 |
| 3,696,736 | 10/1972 | Studli | 418/178 |

FOREIGN PATENTS OR APPLICATIONS

| | | | |
|---|---|---|---|
| 872,815 | 4/1953 | Germany | 418/178 |

Primary Examiner—C. J. Husar
Attorney, Agent, or Firm—Edward F. Connors

[57] ABSTRACT

A rotary piston machine comprising a housing having a bore to receive a three apexed rotor. The bore has a lining formed with a trochoidal surface. The lobes of the surface are formed on curved flexible metal elements and the re-entrant portions of the surface are formed on rigid bridging pieces between the ends of elements.

11 Claims, 7 Drawing Figures

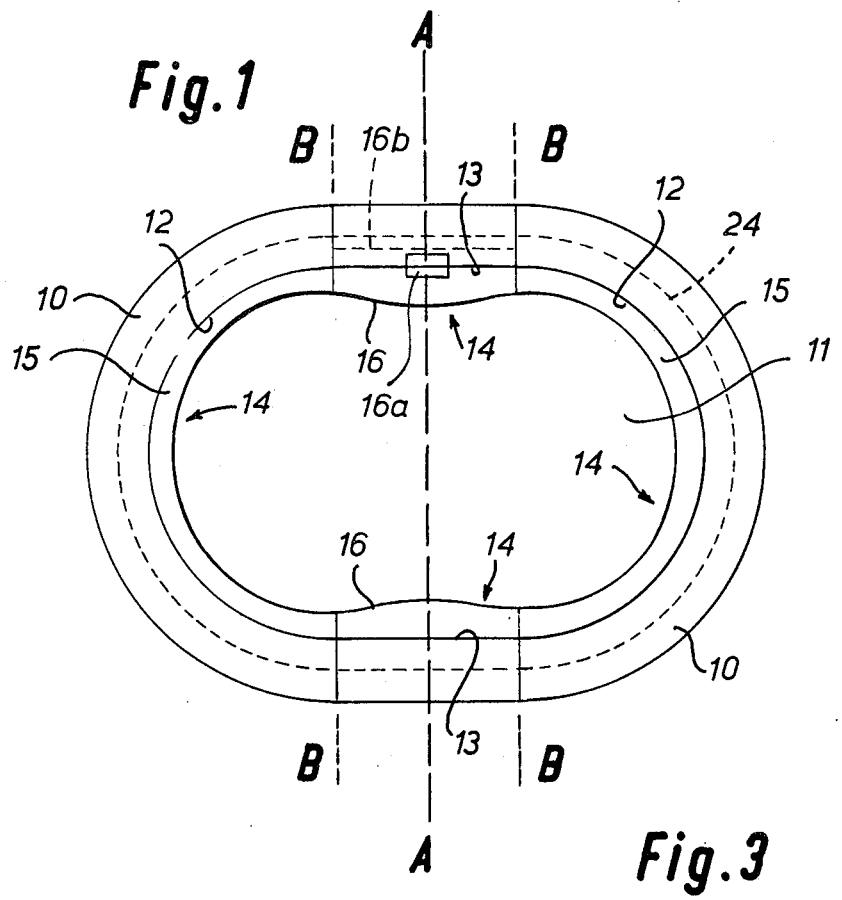
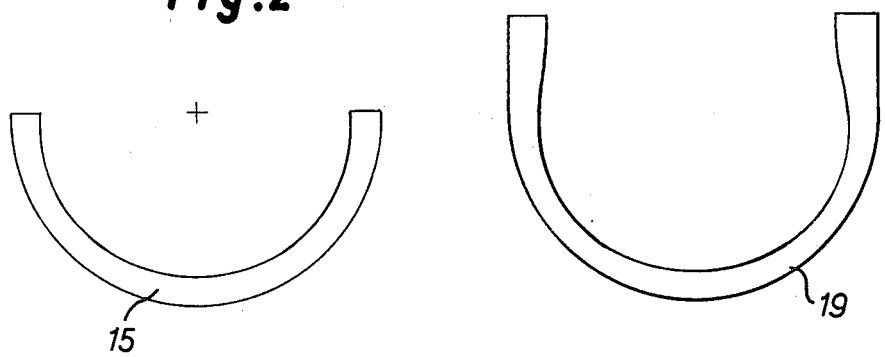

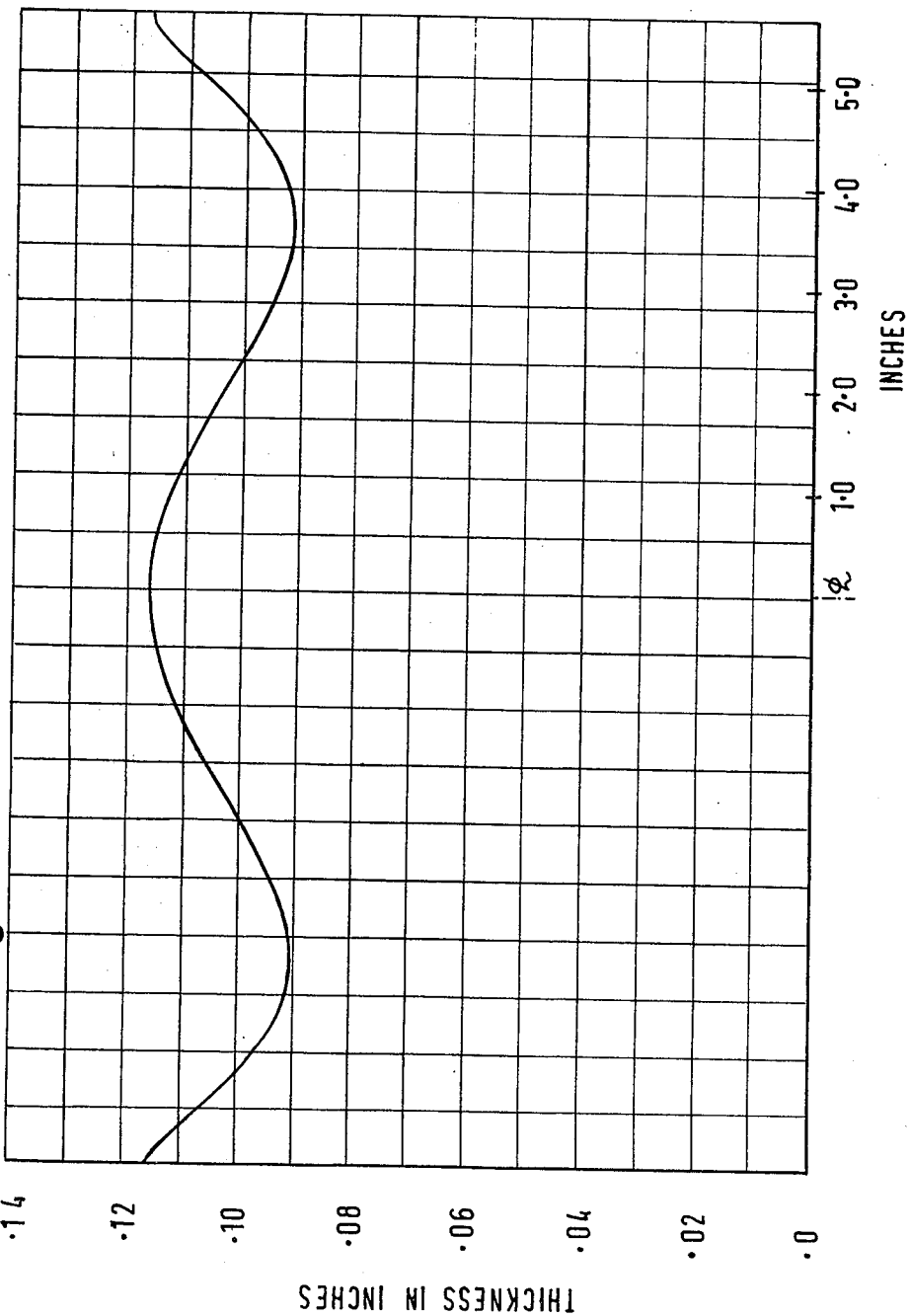

ROTARY PISTON MACHINES

BACKGROUND OF THE INVENTION

1. Field of the Invention

This invention relates to liner elements for rotary piston machines comprising at least one rotor having a plurality of apices and projecting seals at the apices which engage a trochoidal shaped surface in a housing in which the rotor rotates. Such machines include both engines such as Wankel type engines, compressors and pumps having one or more cavities containing rotors rotatable about a common or parallel axes.

2. Description of the Prior Art

U.K. Patent Specification No. 954,750 describes a housing for a rotary piston machine having an elliptical bore into which a bush having an elliptical external surface and a trochoidal inner surface. The forming of the trochoidal surface on a separate bush is intended to overcome certain difficulties said to arise in spraying a suitable wear resistant metal onto a trochoidal surface formed on the bore of the housing itself. However the machining of a trochoidal surface in the bush to be inserted in a bore in the housing or in the housing itself is a difficult operation which requires special machines which are extremely costly. The present invention therefore seeks to provide a liner for the bore of the housing of a rotary piston machine having a trochoidal surface which can be formed by relatively simple operations which avoid the necessity of machining a trochoidal surface.

SUMMARY OF THE INVENTION

The reference to "trochoidal surface" as used throughout this specification is intended to include a surface which is parallel to and spaced outside or inside a true trochoidal surface or a surface having slight variations from a true trochoidal surface.

The invention provides a liner element for a housing for a rotary piston machine, said element comprising a curved flexible metal strip having an inner surface which comprises at least part of a lobe of a trochoidal surface when the strip is assembled in the housing.

The invention also provides a housing for a rotary piston machine having a bore and a liner in the bore having a trochoidal surface to receive a rotor having a plurality of apices, the liner comprising liner elements according to any of the above arrangements.

The invention further provides a method of manufacturing a liner element having a trochoidal shaped inner surface for a housing of a rotary piston machine comprising, bending a flexible metal strip into a curved form to fit in the housing and forming the strip with an internal surface which when the strip is assembled in the housing is a lobe of the trochoidal surface.

BRIEF DESCRIPTION OF THE DRAWINGS

FIG. 1 is a diagrammatic side view of a housing for rotary piston internal combustion engine FIG. 2 is an end view of one form of liner element for the housing;

FIG. 3 is an end view of part of an alternative form of liner element for the housing;

FIG. 7 is a graph showing the variation in shape of the inner surface of the partially formed liner element of FIG. 6.

DESCRIPTION OF THE PREFERRED EMBODIMENT

Figure 4:
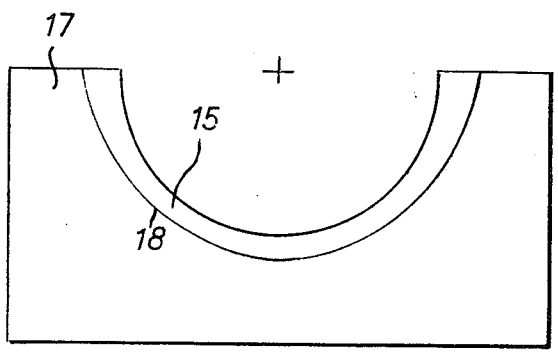
FIG. 4 is an end view of the liner of FIG. 2 inserted in a boring block during the manufacture of the liner part.

Referring firstly to FIG. 1 of the drawings there is shown a housing 10 formed for example from cast iron or aluminium for a rotary piston internal combustion engine of the Wankel type. The housing has a bore 11 in which a three apexed rotor (not shown) operates and the bore of the housing in which the liners are assembled comprises two semi-cylindrical portions 12 joined by two flat portions 13 tangentially blended to said semi-cylindrical portions 12. A steel liner indicated generally by the reference numeral 14 extends around the bore, the liner having a two-lobe trochoidal shaped inner surface. The liner comprises two flexible steel curved liner elements 15 having inner surfaces which form the lobes of the trochoidal surface which elements form around the semi-circular portions 12 of the bore and two bridging pieces 16 extending along the flat portions 13 of the bore. The bridging pieces have re-entrant inner surfaces bridging the lobe surfaces on the liner elements 15. The bridging pieces are fastened to the housing by means such as screws. Each bridging piece may also be located by a key indicated at 16a let into the back of the bridging piece and the housing bore or the bridging piece itself may be let into the bore as indicated by the dotted outline 16b. As described in greater detail later, the circumferential length of the curved elements 15 prior to assembly in the housing is slightly greater than the circumferential length of the semi-circular portions 12 of the bore so that, when assembled in the bore the liner elements are compressed into the semi-circular portions 12 and have an interference fit therewith. The ends of the housing are closed by end covers (not shown) attached to the housing.

Each liner part 15 is manufactured from metal strip. A blank of the strip of the required dimensions is bent into arcuate form and is coin-pressed on its external surface in a semi-cylindrical die. The diameter of this die is larger than the diameter of the housing by the amount required to provide sufficient nip or free spread for assembly in the housing.

The liner element is then transferred to a boring block 17 as illustrated in FIG. 4 and is pressed at its circumferential ends into intimate contact with the surface of the recess 18 in the boring block. The shape of the recess 18 is such that after machining the internal surface of the liner using either a tool which rotates in a circular path or a circular broach moving in an axial direction the liner element will have the required variation in thickness along its circumferential length to provide, when coated, e.g. by plating around its inner surface as described below, the required trochoidal surface when assembled in the engine housing.

After removal from the boring block a hard chromium deposit is applied to the inner surface of the steel liner element and, if necessary, continued around the edges and any openings provided in the liner part using a precision plating process to form a layer of thickness of the order of 1 to 5 thousandths of an inch. The coating may be applied using precision bearing plating techniques, or in the case where a thicker coating is required a plating process known as "Excello-Hone- Forming" may be used in which chromium is deposited simultaneously with honing of the deposit. It is preferred that the plating operation should form the finished surface of the liner parts except possibly honing of the plated surface adjacent the ends of the liner parts, but, if necessary, the liner parts after assembly in the housing may be honed using a hone having a trochoidal periphery of the required shape.

Generally the thickness of the liner is chosen in relation to the housing material thickness so that the relative co-efficients of expansion and temperature gradient from the inner trochoidal surface to the outer surfaces of the housing minimise the distortion effects on the inner surface due to stresses including thermal stresses.

Preferably adjacent ends of the liner elements and bridge pieces are dimensioned so that at each joint between the liner elements there is a slight radially outward step in the surface of the liner in the direction of rotation of the rotor.

In one method of assembly of the liner elements 16 and bridging pieces in the housing 10, the bridging pieces are first secured in the housing 10 which is then expanded by heating and/or the flexible liner parts may be cooled e.g. by plunging in liquid nitrogen. The liner parts 15 are nipped into the parts 12 of the housing bore. Since, as described earlier, the liner elements 15 are made with excess circumferential length the liner elements and bridging pieces are compressed circumferentially on cooling of the assembly and are therefore forced into intimate contact with the housing bore.

The housing may be split along the minor axis A—A of the trochoidal surface or in planes indicated at B—B parallel to the minor axis through the joints between the liner elements and bridging pieces and the liner parts are then assembled in the individual parts of the housing which are then clamped together by bolts. It may be advantageous to adopt the three or four piece housing so that the semi-circular parts of the housing bore can be machined by cutters moving in a circular path or alternatively by circular broaches.

In another method of manufacturing the curved liner elements 15 an arcuate element is deformed over a mandrel which in cross-section has the required trochoidal shape with an allowance for the thickness of plating to be applied to the liner element. The external surface of the element is then machined to a circular profile so that the element when plated as described earlier and assembled in the housing has an internal surface of the required trochoidal shape. It will be appreciated that the inner surface of the liner manufactured using the latter method will not require any finishing operations and so a layer of hard metal could be applied to the inner surface of the strip before the outer surface is machined, that is when the strip is in flat form or after bending the strip into curved form.

Figure 6:
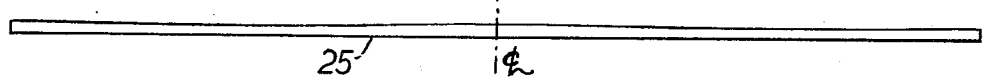
FIG. 6 shows a partly formed liner element.

Referring to FIGS. 6 and 7, a further method a flat blank of steel 25 is form rolled on one face thereof so that the thickness of the blank varies as shown in the graph of FIG. 7 or it may be brought to this shape by any suitable method e.g. machining. The blank is then bent into curved form, assembled in a circular housing and plated as described earlier. Alternatively a circular hone may be used if the liner is held in a shaped housing similar to FIG. 4. The use of the form rolled blank may also provide a first operation to minimise the amount of stock removal in the boring process of FIG. 4.

In a further modification of the housing, the portions 12 of the bore may be trochoidal shaped in which case the flexible liner elements 15 are formed with parallel inner and outer surfaces.

In an alternative construction of the liner 14, the liner is divided into two liner elements along the minor axis of the trochoid, one such element 19 being shown in FIG. 3. In this case no separate bridging pieces are required between the adjacent ends of the liner parts. This form of liner is particularly suitable for a housing which is split along the minor axis A—A of the trochoidal surface.

In the above embodiments the abutting faces of the liner parts lie in planes parallel to the engine axis but this is not essential and the abutting faces could be angled to the axis. For instance the adjacent faces of the two liner parts 15 could converge along the engine axis so that the bridge pieces 16 to be inserted between them are wedge fits between the liner parts. In this case assembly may be carried out by springing the curved liners into place in the bore and then driving the wedge shaped bridging pieces into position in an axial direction to obtain circumferential compression of the liners, and therefore intimate contact of the liners with the housing followed by securing of the bridge pieces to the housing. Alternatively the wedge shaped bridging pieces may first be secured in the housing and the liners pressed into position axially. Furthermore, although the abutting faces of the illustrated embodiments are normal to the housing bore, this is not essential and the faces could lie oblique to the bore. For example the adjacent end faces of the liner elements could converge towards the bore and the end faces of the bridging piece could diverge towards the bore so that by forcing the bridging pieces outwardly into engagement with the bore the ends of the liner elements are forced apart thus compressing the liner elements around the bore circumferentially.

In a still further construction, the adjacent faces of the liner elements and bridging pieces could have inter-engaging V-shaped projections and recess. In this case a complete liner could be assembled prior to insertion into the housing and then inserted in a housing expanded by heating. It will also be appreciated that the positions of the joints between the different parts of the liner or housing could be varied from the positions shown to suit the requirements of other parts of the engine housing such as passages for plugs, ports, engine cooling and other manufacturing requirements.

It will be appreciated that in the area near the sparkplug hole the liner is subjected to high temperature gas during each ignition phase and cold gas mixture at the end of each compression phase which causes cyclic variation in temperature in the housing and such variations in temperature induce circumferential and thermal stresses in the housing and the end covers attached to the housing.

It will be appreciated that the freedom of the liner to expand and contract in the housing helps to accommodate such stresses. The different liner elements around the bore may also be made from different materials of differing thermal expansion coefficients to reduce the variation in stress imposed on the housing by the liner around the housing.

It is preferred that the housing should be made in a metal such as aluminium alloy or cast iron in which case the bore of the housing can conveniently be formed by broaching. Where the housing is formed in a number of components they may be formed in different metals of differing thermal expansion coefficients to minimise the variation in thermal expansion around the housing and thereby reduce the variation in stress applied to the housing end covers around the covers.

Furthermore the different liner elements around the bore may have different heat resistant liner surfaces selected to provide effective seals with the apex seals of the rotor for the different operating temperatures around the housing.

Although in the above methods the wear resistant chrome is applied to the liner parts during their manufacture the chromium may be applied to the liners after assembly in the housing bore followed, if necessary, by finishing operations.

As indicated earlier the housing 10 may be split in planes on either side of the minor axis which pass through or are slightly off set from the joints between the liner parts and bridging pieces in which case the bridge pieces 19 could be formed integrally with the parts of the housing which they engage. It is also envisaged that serrated edges could be provided between the adjacent parts of the housing.

The housing 10 may be formed with an encircling passage or passages indicated at 24 of FIG. 1 for coolant which is/are open continuously or at spaced locations to the back of the liner. The outer surface of the liner is then sealed to the bore on either side of the coolant passage and at joints between liner elements by conventional sealing means or by the use of a material such as "Locktite".

A further modification comprises forming the external surface of the steel back of the liner with a layer of aluminium or aluminium alloy bonded to the back to improve the contact of the liner to the housing and thereby the heat flow.

Figure 5:
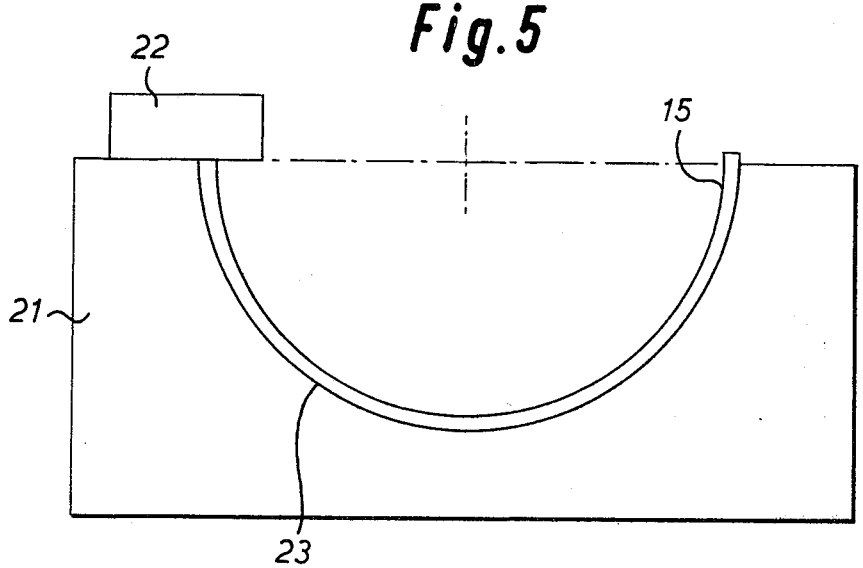
FIG. 5 illustrates a method of measuring the circumferential length of a finished liner part.

As an example, FIG. 5 shows a finished liner 15 inserted in a measuring block 21 for checking the excess circumferential length of the liner. The liner is located in a recess 23 in the block the radius of which is identical to the radius of part 12 of the housing bore and a predetermined checking load is applied at one end of the liner, the other end of which engages under abutment 22.

It will be understood that the compression force applied on the abutments at assembly will be greater than this.

Since the wall thickness of the liner varies considerably around the circumference, it will be necessary to check the wall thickness at closely spaced angular positions around the circumference while the liner is held in a block similar to FIG. 5. In one method a block will have a larger bore so that the liner end is nearly flush with the top surface of the checking block when compressed with a predetermined load.

In the above embodiments steel strip having a coating of chromium is used for the liner 14 but other metals are suitable such as the following:

Aluminium having a hard anodised coating of aluminium:
Steel strip to which a layer of molybdenum is applied:
Steel strip with a layer of austenitic stainless steel;
13 percent Mn steel
Nitrided steel.

We claim:

1. For use with a housing of a rotary piston machine which housing has a bore made up of a plurality of semi-cylindrical portions; liner means comprising at least two curved flexible metal strips each having an inner surface which, when each of the strips is located in a semi-cylindrical portion of the bore, has the shape of a lobe of a trochoidal surface, and means at the ends of each of said pair of metal strips to provide the inner surfaces thereof with re-entrant portions of the trochoidal surface.

2. The invention of claim 1 wherein said means includes rigid ends on each strip the inner surfaces of which have re-entrant portions of the trochoidal surface.

3. The invention of claim 2 wherein the curved flexible part of each strip has a semi-cylindrical outer surface to engage a semi-cylindrical surface in the housing and the rigid ends of the element have flat outer surfaces.

4. A housing for a rotary piston machine, such as a Wankel type rotary piston engine, having a bore composed of at least two oppositely facing semi-cylindrical portions and at least two liner elements located in the two portions of the bore respectively, each of said liner elements being in the form of a curved flexible metal strip and each liner element having a trochoidal shaped inner surface providing one lobe of a complete trochoid, and means at the ends of each liner element to provide the inner surfaces thereof with re-entrant portions of the trochoidal surface.

5. A housing as claimed in claim 4 wherein the bore comprises curved portions in which flexible liner elements engage having lobe shaped inner surface and said means includes portions bridging said curved portions and separate from said flexible liner elements and having re-entrant inner surfaces between adjacent lobes of the trochoidal surface.

6. A housing as claimed in claim 4 wherein the bore comprises two semi-cylindrical portions in which flexible liner elements each having a lobe shaped inner surface engage and said means includes portions extending tangentially between the ends of the semi-cylindrical portions against which separate rigid liner elements engage having re-entrant inner surfaces forming part of the trochoidal surfaces.

7. A housing as claimed in claim 5 wherein the curvature of the curved liner elements prior to assembly in the bore is greater than the curvature of the curved portions of the bore so that on assembly in the bore the curved liner portions press outwardly against the bore.

8. A housing as claimed in claim 4 wherein the length of the liner prior to assembly in the bore is greater than the circumferential length of the bore so that the liner is compressed against the bore.

9. A housing as claimed in claim 4 wherein the housing is split in planes passing through the end to end joints between liner elements in the bore in the housing.

10. A housing as claimed in claim 4 wherein the liner elements around the bore are formed from different materials having differing thermal expansion coefficients selected to provide a uniform stress on the housing due to thermal expansion of the liner despite operating temperature variation around the housing.

11. A housing as claimed in claim 4 wherein the housing has an encircling passage for coolant open continuously or at spaced locations around the housing to the outer surface of the liner.

* * * * *